(12) United States Patent
Ma et al.

(10) Patent No.: US 12,203,755 B2
(45) Date of Patent: Jan. 21, 2025

(54) MICROMACHINED GYROSCOPE AND ELECTRONIC PRODUCT

(71) Applicant: AAC Kaitai Technologies (Wuhan) CO., LTD, Hubei (CN)

(72) Inventors: Zhao Ma, Shenzhen (CN); Zhan Zhan, Shenzhen (CN); Xiao Kan, Shenzhen (CN); Shan Yang, Shenzhen (CN); Shitao Yan, Shenzhen (CN); Hongtao Peng, Shenzhen (CN); Yang Li, Shenzhen (CN); Kahkeen Lai, Singapore (SG); Veronica Tan, Singapore (SG); Yan Hong, Shenzhen (CN)

(73) Assignee: AAC KAITAI TECHNOLOGIES (WUHAN) CO., LTD, Wuhan (CN)

( * ) Notice: Subject to any disclaimer, the term of this patent is extended or adjusted under 35 U.S.C. 154(b) by 259 days.

(21) Appl. No.: 17/873,191

(22) Filed: Jul. 26, 2022

(65) Prior Publication Data
US 2023/0280162 A1    Sep. 7, 2023

(30) Foreign Application Priority Data

Mar. 4, 2022 (CN) .......................... 202210214435.0

(51) Int. Cl.
*G01C 19/5747* (2012.01)
*G01C 19/5712* (2012.01)

(52) U.S. Cl.
CPC ..... *G01C 19/5747* (2013.01); *G01C 19/5712* (2013.01)

(58) Field of Classification Search
CPC ........................ G01C 19/5747; G01C 19/5712
See application file for complete search history.

(56) References Cited

U.S. PATENT DOCUMENTS

| | | | |
|---|---|---|---|
| 2010/0263446 A1* | 10/2010 | Tamura .............. | G01C 19/5712 73/504.12 |
| 2012/0024056 A1* | 2/2012 | Hammer ............ | G01C 19/5712 73/504.02 |
| 2013/0031977 A1* | 2/2013 | Kempe .................. | G01C 19/56 73/504.04 |

(Continued)

*Primary Examiner* — Helen C Kwok
(74) *Attorney, Agent, or Firm* — W&G Law Group

(57) ABSTRACT

A micromachined gyroscope and an electronic product are provided. The micromachined gyroscope includes a driving component, a detecting component, first connecting components, and second connecting components. The driving component includes first driving pieces, second driving pieces, and driving devices driving the first driving pieces and the second driving piece to move. The detecting component includes first detecting pieces arranged along a third direction, second detecting pieces arranged along a fourth direction, and detecting devices for detecting movement distances of the first detecting pieces and/or the second detecting pieces along a fifth direction. Each of the first connecting pieces and the second connecting pieces rotates around a center thereof, so the second detecting pieces and the first detecting pieces respectively reciprocate along the third direction and the fourth direction. The micromachined gyroscope and the electronic product realize differential detection and effectively avoid influence of acceleration shock and quadrature error.

10 Claims, 4 Drawing Sheets

(56) References Cited

U.S. PATENT DOCUMENTS

| | | | | |
|---|---|---|---|---|
| 2015/0059473 A1* | 3/2015 | Jia | ............... | G01C 19/5747 |
| | | | | 73/504.12 |
| 2015/0211854 A1* | 7/2015 | Ruohio | ............ | B81B 3/0043 |
| | | | | 73/504.12 |
| 2018/0031602 A1* | 2/2018 | Huang | ............ | G01P 15/13 |
| 2019/0145772 A1* | 5/2019 | Acar | ............ | G01C 19/5712 |
| | | | | 73/504.12 |
| 2021/0364291 A1* | 11/2021 | Blomqvist | ......... | G01C 19/574 |
| 2021/0381833 A1* | 12/2021 | Vohra | ............ | G01C 19/5712 |

* cited by examiner

MICROMACHINED GYROSCOPE AND ELECTRONIC PRODUCT

TECHNICAL FIELD

The present disclosure relates to a technical field of gyroscopes, and in particular to a micromachined gyroscope and an electronic product.

BACKGROUND

A micromachined gyroscope is a typical angular velocity sensor. Due to advantages of small size, low power consumption, low cost, and integration, the micromachined gyroscope has a very wide range of applications in the consumer electronics market. In recent years, with gradual improvement of performance of the micromachined gyroscope, it has received close attention in many application fields.

The micromachined gyroscope in the prior art has high sensitivity and simple structure. However, it is unable to realize differential detection in all axes, resulting a large error in detection.

Therefore, it is necessary to provide a micromachined gyroscope to solve above problems.

SUMMARY

Purpose of the present disclosure is to provide a micromachined gyroscope and an electronic product to realize differential detection and effectively avoid influence of acceleration shock and quadrature error.

The present disclosure provides a micromachined gyroscope. The micromachined gyroscope comprises a driving component, a detecting component, two first connecting components, and two second connecting components.

The driving component comprises first driving pieces, second driving pieces, and driving devices. The driving devices drive the first driving pieces and the second driving piece to move, so when the first driving pieces move along a first direction, the second driving pieces move along a second direction perpendicular to the first direction. The detecting component comprises two first detecting pieces arranged along a third direction, two second detecting pieces arranged along a fourth direction, and detecting devices for detecting movement distances of the first detecting pieces and/or movement distances of the second detecting pieces along a fifth direction. The two first connecting components are arranged along the fourth direction. Each of the first connecting components is connected with an adjacent first driving piece, an adjacent second driving piece, and an adjacent first detecting piece. Each of the first connecting pieces rotates around a center of each of the first connecting pieces, so the second detecting pieces reciprocate along the third direction. The two second connecting components are arranged along the third direction. Each of the second connecting components is connected with an adjacent first driving piece, an adjacent second driving piece, and an adjacent second detecting piece. Each of the second connecting pieces rotates around a center of each of the second connecting pieces, so the first detecting pieces reciprocate along the fourth direction. A predetermined angle is defined between the first direction and the third direction. The fifth direction is perpendicular to the first direction and the third direction.

In one optional embodiment, the driving devices control the two first driving pieces to move in opposite directions along the first direction. The driving devices control the two second driving pieces to move in opposite directions along the second direction. When the two first driving pieces move close to each other, the two second driving pieces move away from each other. When the two first driving pieces move away from each other, the two second driving pieces move close to each other.

In one optional embodiment, the first driving pieces and the second driving pieces comprises mounting holes. Each of the driving devices is arranged in a corresponding mounting hole. Along the fifth direction, the detecting devices are arranged above the first detecting pieces. There is a gap between each of the detecting devices and a corresponding first detecting piece; and/or along the fifth direction, the detecting devices are arranged above the second detecting pieces. There is a gap between each of the detecting devices and a corresponding second detecting piece.

In one optional embodiment, in the first connecting components and the second connecting components comprises rotating pieces, connecting beams and first flexible beams. The micromachined gyroscope further comprises first fixing pieces. The two first driving pieces are symmetrically arranged along the rotating pieces. The two second driving pieces are symmetrically arranged along the rotating pieces. Each of the first driving pieces is connected with a corresponding rotating piece through a corresponding connecting beam and each of the second driving pieces is connected with a corresponding rotating piece through a corresponding connecting beam, so the rotating pieces are driven to rotate with respect to the first fixing pieces. Each of the first detecting pieces and/or each of the second detecting pieces is connected with the corresponding rotating piece through a corresponding first flexible beam.

In one optional embodiment, the first connecting components and the second connecting components comprise second flexible beams. A first end of each of the second flexible beam is connected with a corresponding rotating piece. A second end of each of the second flexible beam is connected with a corresponding first fixing piece.

In one optional embodiment, the micromachined gyroscope further comprises second fixing pieces and guide beams. A first end of each of the guide beams is connected with a corresponding second fixing piece. A second end of each of the guide beams is connected with a corresponding first driving piece or a corresponding second driving piece.

A plurality of second fixing pieces are arranged at intervals along a circumferential direction of each of the first driving pieces and/or each of the second driving pieces to limit movements of the first driving pieces and/or the second driving pieces.

In one optional embodiment, the micromachined gyroscope further comprises third fixing pieces and third flexible beams. A first end of each of the third flexible beams is connected with a corresponding third fixing piece and a second end of each of the third flexible beams is connected with a corresponding first detecting piece or a corresponding second detecting piece to limit movements of the first detecting pieces or the second detecting pieces.

In one optional embodiment, the micromachined gyroscope further comprise a central connecting piece and fourth flexible beams. Two ends of the central connecting piece are respectively connected with the two first detecting pieces through corresponding fourth flexible beams along the third direction. Another two ends of the central connecting piece are respectively connected with the two second detecting pieces through corresponding fourth flexible beams.

In one optional embodiment, a driving capacitor is formed between each of the driving devices and the corresponding first driving piece and/or the corresponding second driving piece. A detecting capacitance is formed between each of the detecting devices and the corresponding first detecting piece and/or the corresponding second detecting piece.

The present disclosure further provides an electronic product. The electronic product comprises a main body and the micromachined gyroscope mentioned above. The micromachined gyroscope is installed in the main body.

In the present disclosure, a pair of the first detecting pieces are arranged along the third direction and a pair of the second detecting pieces are arranged along the fourth direction. The first detecting pieces are configured for detecting an angular velocity acted in the third direction of the micromachined gyroscope, and the second detecting pieces are configured for detecting an angular velocity acted in the fourth direction of the micromachined gyroscope, which realize detection of different axes and reduce detection error. The two first detecting devices and the two second detecting devices are respectively symmetrically arranged, which increase movement stability of the first detecting devices and the second detecting devices, facilitate realization of differential detection, and effectively avoid influence of acceleration shock and quadrature error.

It should be understood that the foregoing general description and the following detailed description are exemplary only and do not limit the present disclosure.

Figure 1:
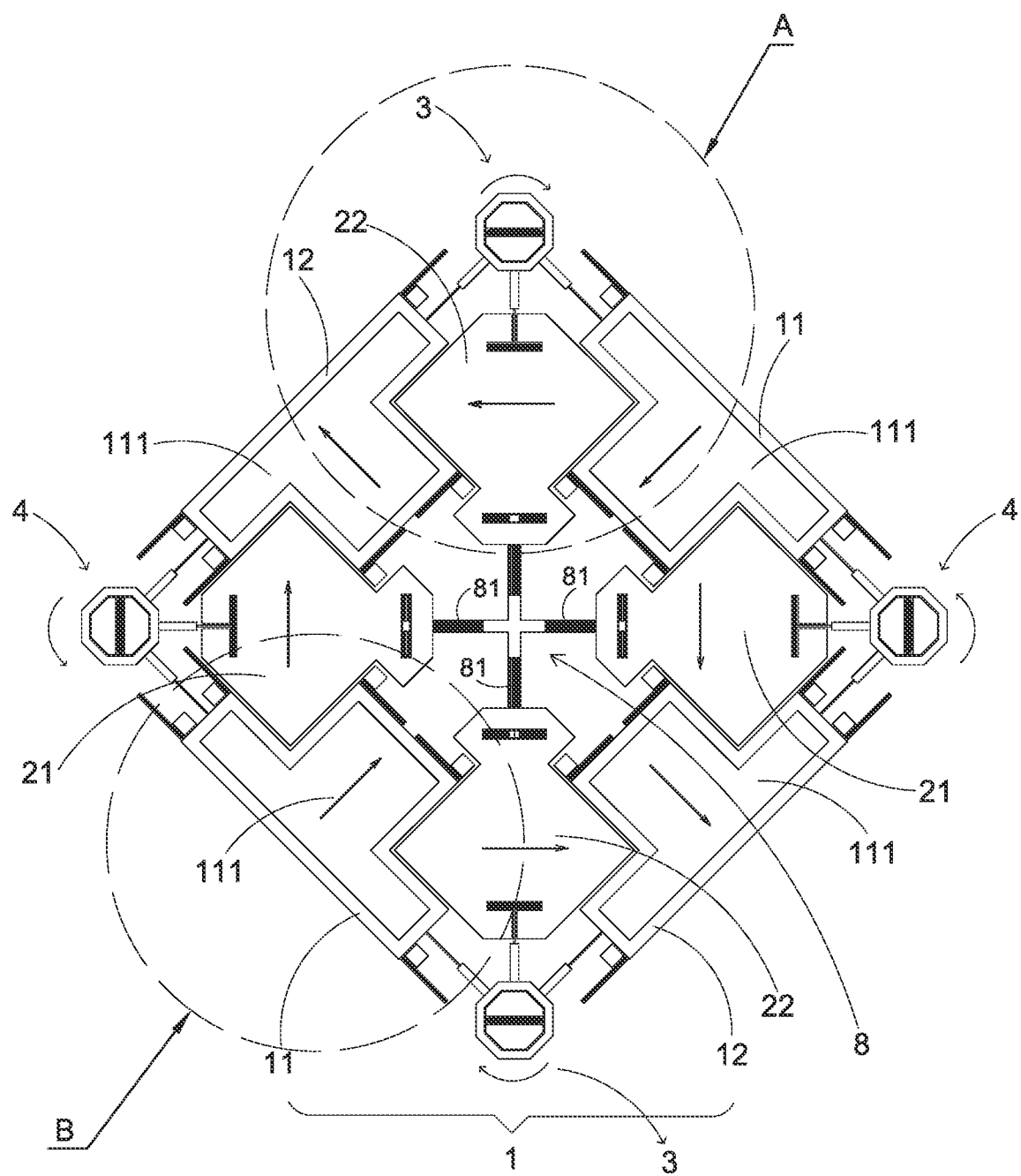
FIG. 1 is a schematic diagram of a micromachined gyroscope according to one embodiment of the present disclosure.

1—driving component; 11—first driving piece; 111—mounting hole; 12—second driving piece; 2—detecting component; 21—first detecting piece; 22—second detecting piece; 23—detecting device; 231—detecting capacitance; 3—first connecting component; 31—rotating piece; 32—connecting beam; 33—first flexible beam; 34—second flexible beam; 4—second connecting component; 5—first fixing piece; 6—second fixing piece; 61—guide beam; 7—third fixing piece; 71—third flexible beam; 8—central connecting piece; 81—fourth flexible beam; L—first direction; K—second direction; X—third direction; Y—fourth direction; Z—fifth direction.

The accompanying drawings, which are incorporated in and constitute a part of the specification, illustrate embodiments of the present disclosure and explain principles of the present disclosure together with the specification.

DETAILED DESCRIPTION

The present disclosure will be further described below with reference to the accompanying drawings and embodiments.

Terms used in the embodiments of the present disclosure are only for the purpose of describing specific embodiments, and are not intended to limit the present disclosure. As used in the embodiments and the appended claims of the present disclosure, singular forms such as "a, kind of", "the", and "said" are intended to include the plural forms as well, unless the context clearly dictates otherwise.

It should be understood that the term "and/or" used in the present disclosure is only used to illustrate an association relationship to describe the associated objects, indicating that there may be three kinds of relationships. For example, limitations A and/or B, which may indicate that A exists alone, A and B exist at the same time, or B exists alone. In addition, the character "/" in the present disclosure generally indicates that the related objects are an "or" relationship.

It should be understood in the description of the embodiments of the present disclosure that orientation terms such as "upper", "lower", "left", and "right", etc. indicate direction or position relationships shown based on angles shown in the drawings, and should not be regarded as limitations to the embodiments of the present disclosure. Further, in the context, it should also be understood that when an element is referred to as being "on" or "under" another element, it can not only be directly connected "on" or "under" another element, but also be indirectly connected "on" or "under" the another element through an intervening element.

The present disclosure provides a micromachined gyroscope. As shown in FIG. 1, the micromachined gyroscope comprises a driving component 1, a detecting component 2, two first connecting components 3, and two second connecting components 4.

The driving component 1 comprises first driving pieces 11, second driving pieces 12, and driving devices. The driving devices drive the first driving pieces 11 and the second driving piece 12 to move, so when the first driving pieces 11 move along a first direction L, the second driving pieces move along a second direction K perpendicular to the first direction L. The detecting component 2 comprises two first detecting pieces 21 arranged along a third direction X, two second detecting pieces 22 arranged along a fourth direction Y, and detecting devices 23 for detecting movement distances of the first detecting pieces 21 and/or movement distances of the second detecting pieces 22 along a fifth direction Z. The two first connecting components 3 are arranged along the fourth direction Y. Each of the first connecting components 3 is connected with an adjacent first driving piece 11, an adjacent second driving piece 12, and an adjacent first detecting piece 21. Each of the first connecting pieces 3 rotates around a center of each of the first connecting pieces 3, so the second detecting pieces 22 reciprocate along the third direction X. The two second connecting components 4 are arranged along the third direction X. Each of the second connecting components 4 is connected with an adjacent first driving piece 11, an adjacent second driving piece 12, and an adjacent second detecting piece 22. Each of the second connecting pieces 4 rotates around a center of each of the second connecting pieces 4, so the first detecting pieces 21 reciprocate along the fourth direction Y.

In the present disclosure, the micromachined gyroscope is a dual-axis micromachined gyroscope, that is, it is configured for detecting an angular velocity in the third direction X and the fourth direction Y. In any one of the embodiments of the present disclosure, a predetermined angle of 45 degrees is defined between the first direction L and the third direction X. The fifth direction is perpendicular to the first direction and the third direction. At this time, the third direction X is a direction along 0° direction, the first direction L is a direction along the 45° direction, the fourth direction Y is a direction along the 90° direction, and the second direction K is a direction along the 135° direction, and the fifth direction Z is perpendicular to planes where the first direction L and the third direction X are located.

In the embodiment, the micromachined gyroscope has a drive mode and a sense mode. As shown in FIG. 1, when the micromachined gyroscope is in the drive mode, the driving devices control the first driving pieces 11 to move along the first direction L and controls the second driving pieces 12 to move in the second direction K. Thus, the first detecting pieces 21 reciprocate in the fourth direction Y through the second connecting components 4, or the second detecting pieces 3 reciprocate in the third direction X through the first connecting components. When the micromachined gyroscope senses the angular velocity applied from outside, according to the Coriolis principle, the first detecting pieces 21 or the second detecting pieces 22 under action of the Coriolis force and generate a displacement in the fifth direction Z. At this time, the detecting devices 22 detect moving distances of the first detecting pieces 21 or the second detecting pieces 22, and send a detection result to a computing system (not shown in the drawings). The computing system calculates a value of the angular velocity applied to the micromachined gyroscope according to the received data.

A pair of the first detecting pieces 21 are arranged along the third direction X and a pair of the second detecting pieces 22 are arranged along the fourth direction Y. The first detecting pieces 21 are configured for detecting an angular velocity acted in the third direction X of the micromachined gyroscope, and the second detecting pieces 22 are configured for detecting an angular velocity acted in the fourth direction Y of the micromachined gyroscope, which realize detection of different axes and reduce detection error. The two first detecting devices 21 and the two second detecting devices 22 are respectively symmetrically arranged, which increase movement stability of the first detecting devices 21 and the second detecting devices 22, facilitate realization of differential detection, and effectively avoid influence of acceleration shock and quadrature error.

Specifically, a pair of the first driving pieces 11 and a pair of the second driving pieces 12 are respectively arranged along the first direction L and the second direction K. When the micromachined gyroscope is in the drive mode, the driving devices control the two first driving pieces to moves in a direction opposite to the first direction L, and controls the two second driving pieces 12 to move in a direction opposite to the second direction K.

When the first driving pieces 11 and the second driving pieces 12 move respectively in the directions shown in FIG. 1, the first connecting components 3 and the second connecting components 4 around a center of the direction shown in FIG. 1, so that the second detecting pieces 22 and the first detecting pieces 21 respectively connected with the first connecting components 3 and the second connection components 4 move in the directions shown in FIG. 1. At this time, the two first detecting pieces 21 move in a direction opposite to the fourth direction Y and the two second detecting pieces 22 move in a direction opposite to the third direction X to realize differential detection. The sense modes in the third direction X and the fourth direction Y do not interfere with each other, which reduce detection error.

When the two first driving pieces 11 move close to each other along the first direction K, the two second driving pieces 12 move away from each other along the second direction K. When the two first driving pieces 21 move away from each other along the first direction, the two second driving pieces 22 move close to each other along the second direction K, which realize reciprocating motion of the first detecting pieces 21 and the second detecting pieces 22. The two first driving pieces 11 and the two second driving pieces 12 are respectively symmetrically arranged, so differential driving is realized, and driving stability of the micromachined gyroscope is effectively improved.

In one specific embodiment, in the first connecting components 3 and the second connecting components 4 comprises rotating pieces 31, connecting beams 32 and first flexible beams 33. The micromachined gyroscope further comprises first fixing pieces 5. The two first driving pieces 11 are symmetrically arranged along the rotating pieces 31. The two second driving pieces 12 are symmetrically arranged along the rotating pieces 31. Each of the first driving pieces 11 is connected with a corresponding rotating piece 31 through a corresponding connecting beam 32 and each of the second driving pieces 12 is connected with a corresponding rotating piece 31 through a corresponding connecting beam 32, so the rotating pieces 31 are driven to rotate with respect to the first fixing pieces 5. Each of the first detecting pieces 21 and/or each of the second detecting pieces 22 is connected with the corresponding rotating piece 31 through a corresponding first flexible beam 33.

Figure 2:
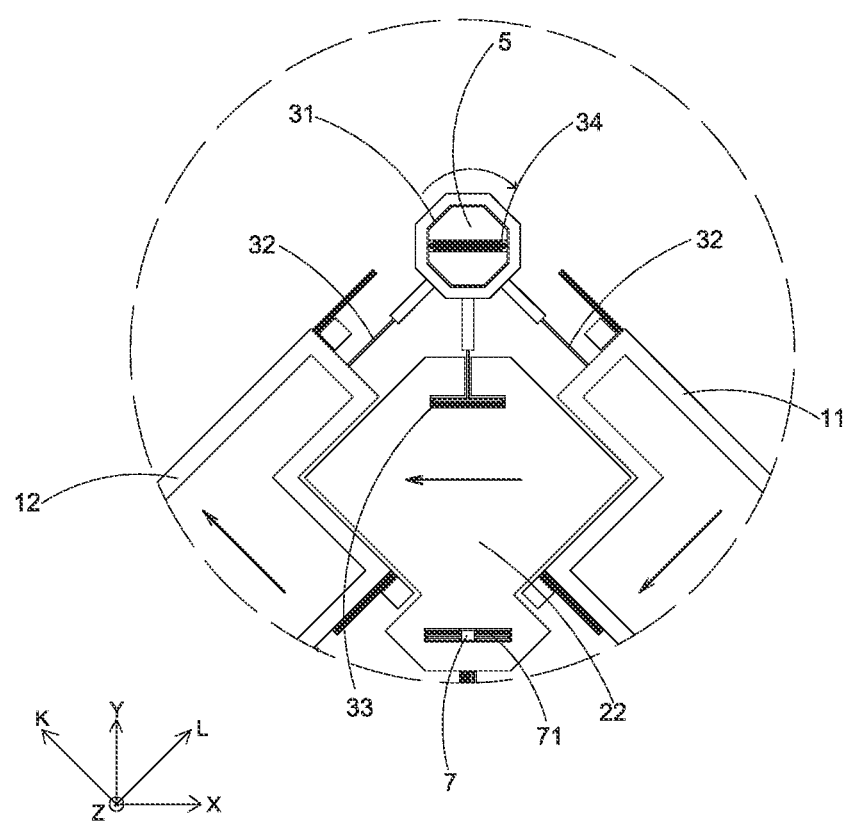
FIG. 2 is an enlarged view of portion A shown in FIG. 1.

The present disclosure takes the first connecting components 3 as an example. As shown in FIG. 2, the first driving pieces 11 and the second driving pieces 12 are symmetrically arranged along the first connecting components 3, and the first driving pieces 11 are connected with the second driving pieces 12 through the rotating piece 31 and the connecting beams 32. When the micromachined gyroscope is in the drive mode, the first driving pieces 11 move along the first direction L and the second driving pieces 12 move along the second direction K. The first driving pieces 11 and the second driving pieces 12 drive the rotating pieces 31 to rotate around a respective first fixing piece 5 through the connecting beams 32, so that the second detecting pieces 22 connected with the rotating pieces 3 reciprocate along the third direction X.

During the process, two ends of each of the first flexible beam 33 are respectively connected with a corresponding rotating piece 31 and a corresponding second detecting piece 22, so as to limit the displacement of the second detecting pieces 22 along the third direction X. When the micromachined gyroscope is in the sense mode, the second detection pieces 22 move along the fifth direction Z. At this time, the first flexible beams 33 limit the displacements of the second detecting pieces 22 along the fifth direction Z.

Similarly, the first flexible beams 33 further limit the displacements of the first detection pieces 21 along the fourth direction Y and the fifth direction Z.

The connecting beams 32 and the first flexible beams 33 are deformed during the process, so as to avoid damage under a large force, thereby prolonging service life of the connecting beams 32 and the first flexible beams 33 and increasing motion stability of the first driving pieces 11, the second driving pieces 12, the first detecting pieces 21 and the second detecting pieces 22 and further increasing service life and working stability of the micromachined gyroscope.

The first connecting components 3 and the second connecting components 4 comprise second flexible beams 34. A first end of each of the second flexible beam 34 is connected with a corresponding rotating piece 31. A second end of each of the second flexible beam 34 is connected with a corresponding first fixing piece 5. The second flexible beams 34 limit a rotation angle of the rotating pieces 31 and increase movement stability of the rotating pieces 31, thereby limiting the displacements of the first driving pieces 11 along the first direction L and the displacements of the second driving pieces 12 along the second direction K, which further improve stability of the drive mode.

In the embodiment, when the micromachined gyroscope only is in the drive mode, the first driving pieces 11 and the second driving pieces 12 drive the second detecting pieces 22 to reciprocate along the third direction X and drive the first detecting pieces 21 to reciprocate along the fourth direction Y through the first connecting components 3 and the second connecting components 4. At this time, the first detecting pieces 21 and the second detecting pieces 22 have no displacement in the fifth direction A, preventing a wrong angular velocity from being calculated;

When the sense mode of the micromachined gyroscope is activated, the first detecting pieces 21 and the second detecting pieces 22 move along the fifth direction Z. At this time, the first driving pieces 11 and the second driving pieces 12 have no displacement, thereby reducing the error of the detection result. By arranging the first connecting components 3 and the second connecting components 4, the mutual interference between the drive mode and the sense mode of the micromachined gyroscope is avoided, and the measurement error is reduced while the driving stability is improved.

In one optional embodiment, the micromachined gyroscope further comprises second fixing pieces 6 and guide beams 61. A first end of each of the guide beams 61 is connected with a corresponding second fixing piece 6. A second end of each of the guide beams 61 is connected with a corresponding first driving piece 11 or a corresponding second driving piece 12. A plurality of second fixing pieces 6 are arranged at intervals along a circumferential direction of each of the first driving pieces 11 and/or each of the second driving pieces 12 to limit movements of the first driving pieces 11 and/or the second driving pieces 12.

The present disclosure takes the first driving pieces 11 as an example, the first end of each of the guide beams 61 is fixedly connected with the corresponding second fixing piece 6, and the second end of each of the guide beams 61 is fixedly connected with the first driving pieces 11, which limit the displacements of the first driving pieces 11 along the first direction L and improve the movement stability of the first driving pieces 11. Similarly, the guide beams 61 also limit the displacements of the second driving pieces 12 along the second direction K, so as to improve the movement stability of the second driving pieces 12.

Figure 3:
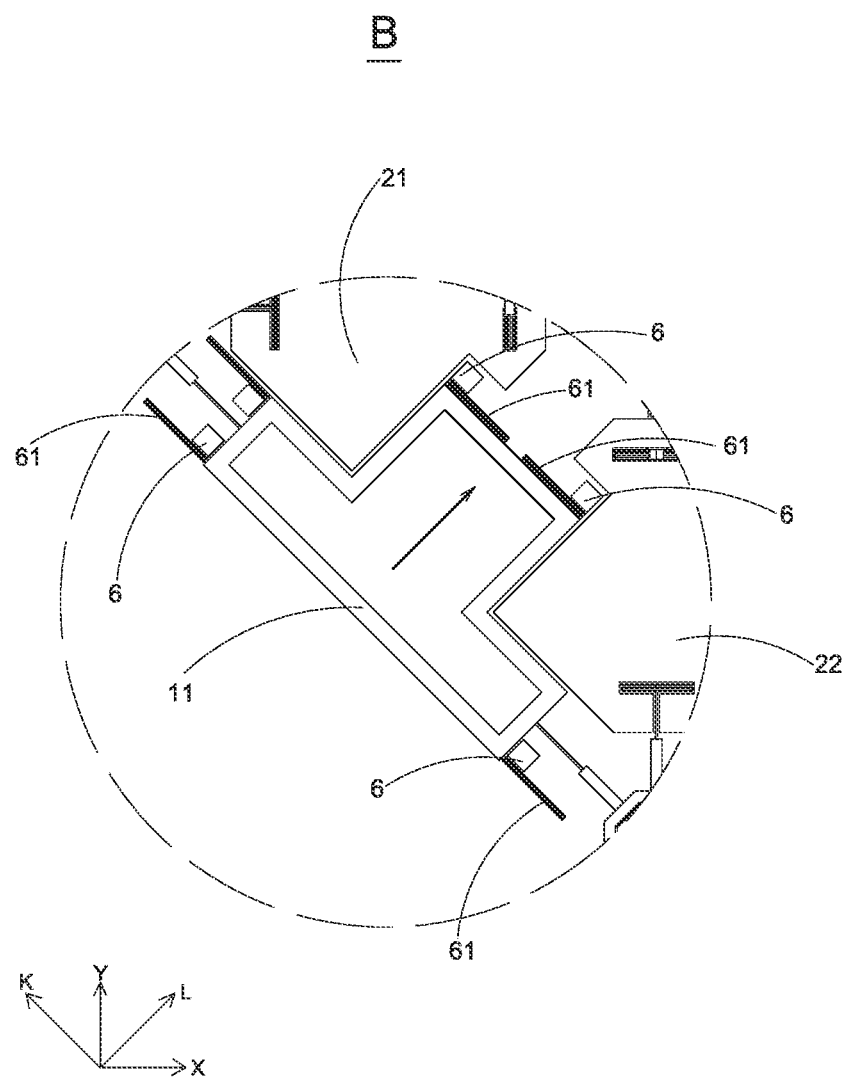
FIG. 3 is an enlarged view of portion B shown in FIG. 1.

The number and positions of the second fixing pieces 6 are not specifically limited in the present disclosure. As shown in FIG. 3, when the plurality of second fixing pieces 6 are arranged at intervals along the circumferential direction of each of the first driving pieces 11 and/or each of the second driving pieces 12, the moving directions of the first driving pieces 11 and the second driving pieces 12 are further limited, so as to prevent the first driving pieces 11 from being displaced in the second direction K, or prevent the second driving pieces 12 from being displaced in the first direction L.

In one specific embodiment, as shown in FIG. 2, the micromachined gyroscope further comprises third fixing pieces 7 and third flexible beams 71. A first end of each of the third flexible beams 71 is connected with a corresponding third fixing piece 7 and a second end of each of the third flexible beams 71 is connected with a corresponding first detecting piece 21 or a corresponding second detecting piece 22 to limit movements of the first detecting pieces or the second detecting pieces.

The present disclosure takes the second detecting pieces 22 as an example. When the micromachined gyroscope is in the drive mode, the second detecting pieces 22 reciprocate along the third direction X, and the third flexible beams 71 limit displacements of the second detecting pieces 22 in the third direction X. When the micromachined gyroscope is in the sense mode, the second detecting pieces 22 move along the fifth direction Z, and the third flexible beams 71 limit the displacements of the second detecting pieces 22 in the fifth direction Z. Similarly, the third flexible beams 71 further limit the displacements of the first detecting pieces 21 in the fourth direction Y and the fifth direction Z, and improve the movement stability of the first detecting pieces 21 and the second detection pieces 22.

In one optional embodiment, as shown in FIG. 1, the micromachined gyroscope further comprise a central connecting piece 8 and fourth flexible beams 81. Two ends of the central connecting piece 8 are respectively connected with the two first detecting pieces 21 through corresponding fourth flexible beams 81 along the third direction. Another two ends of the central connecting piece 8 are respectively connected with the two second detecting pieces 22 through corresponding fourth flexible beams 81.

The two first detecting pieces 21 arranged along the third direction X and the two second detecting pieces 22 arranged along the fourth direction Y are coupled through the central connecting piece 8, so that the micromachined gyroscope realize anti-phase vibration in the sense mode in the third direction X and the sense mode in the fourth direction Y. The total moment of the micromachined gyroscope is balanced, which effectively realizes the differential detection, effectively avoids influence of the acceleration shock and quadrature error to the detection result, and improve detection accuracy and sensitivity of the micromachined gyroscope.

A specific shape of the central connecting piece 8 is not limited in the present disclosure. It can be a cross structure as shown in the embodiment of FIG. 1, or the central connecting piece 8 is a rectangular structure or a diamond structure, etc., only if the central connecting piece 8 is able to couple the two first detecting pieces 21 and the two second detecting pieces 22 in the sense mode.

Figure 4:
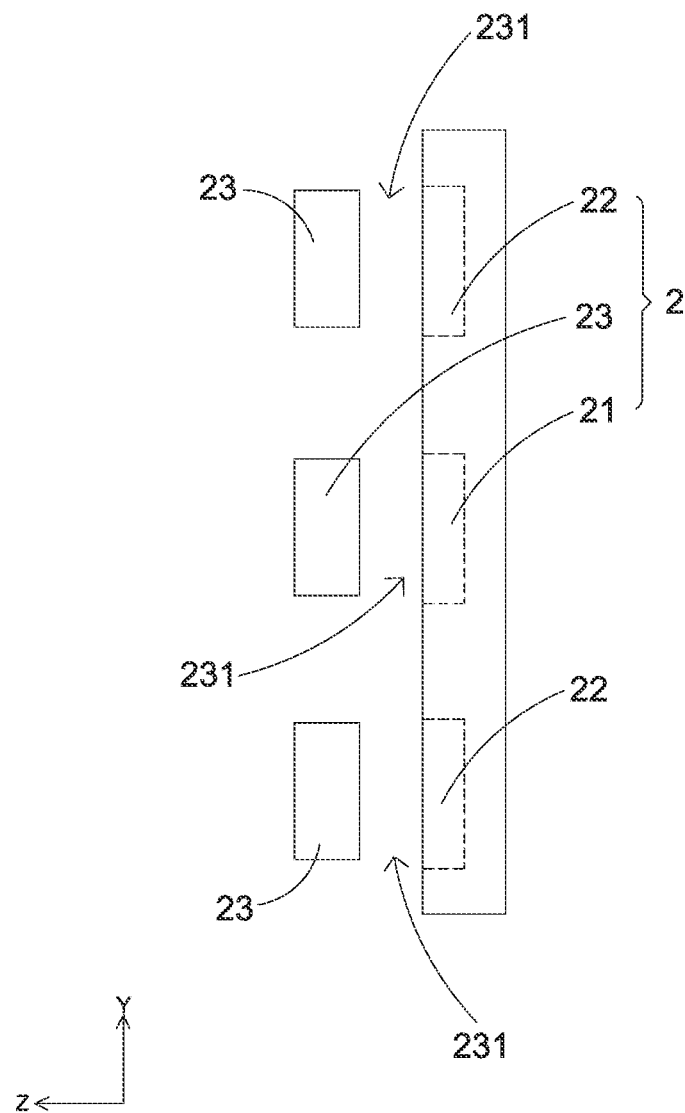
FIG. 4 is a side view of the micromachined gyroscope shown in FIG. 1.

Specifically, as shown in FIG. 1, the first driving pieces 11 and the second driving pieces 12 comprises mounting holes 111. Each of the driving devices is arranged in a corresponding mounting hole 111. As shown in FIG. 4, along the fifth direction Z, the detecting devices 23 are arranged above the first detecting pieces 21. There is a gap between each of the detecting devices and a corresponding first detecting piece 21; and/or along the fifth direction, the detecting devices are arranged above the second detecting pieces 22, and there is a gap between each of the detecting devices and a corresponding second detecting piece 22.

In the embodiment, the driving devices are configured for driving the first driving pieces 11 and the second driving pieces 12 to move, and the detecting devices 23 are configured for detecting the displacements of the first detecting pieces 21 and the second detecting pieces 22 along the fifth direction Z. As shown in the embodiment of FIG. 1, the driving devices (not shown in the drawings) are mounted in the mounting holes 111, which simplifies a mounting structure, saves an overall volume of the micromachined gyroscope, and reduces a weight of the micromachined gyroscope.

As shown in FIG. 4, the detecting devices 23 are mounted on an outside of a driving surface of the micromachined gyroscope and are arranged above the first detecting pieces 21 along the fifth direction Z and there is the gap between each of the detecting devices and the corresponding first detecting piece 21; and/or along the fifth direction Z, the detecting devices 23 are arranged above the second detecting pieces 22, and there is the gap between each of the detecting devices 23 and the corresponding second detecting piece 22, so that an area of the detecting devices 23 is increased, and an electromechanical coupling coefficient of the detection of the micromachined gyroscope is effectively improved, thereby improving the detection sensitivity and signal-to-noise ratio of the micromachined gyroscope, and further reducing the detection error.

Specifically, a driving capacitor is formed between each of the driving devices and the corresponding first driving piece 11 and/or the corresponding second driving piece 12. When the micromachined gyroscope is in the drive mode, a distance between a positive electrode structure and a negative electrode structure of each of the driving devices changes, so that the first driving pieces 11 move in the first direction L, and the second driving pieces 12 move in the second direction K. As shown in FIG. 4, a detecting capacitance 231 is formed between each of the detecting devices 23 and the corresponding first detecting piece 21 and/or the corresponding second detecting piece 22. When the micromachined gyroscope is in the sense mode, the first detecting pieces 21 and the second detecting pieces 22 are subjected to the Coriolis force and move along the fifth direction Z, so that a distance between a positive electrode structure and a negative electrode structure of each detecting capacitor 231 changes and the movement distances of the first detecting pieces 21 and/or the second detecting pieces 22 are detected.

The detecting capacitors 231 transmit a capacitance change value to the computing system, and the computing system calculates the value of the angular velocity applied to the micromachined gyroscope through the received value. The driving capacitors and the detecting capacitors 231 are convenient to control the movement of the first driving pieces 11, the second driving pieces 12, the first detecting pieces 21 and the second detecting pieces 22. Further, structures of the driving device and the detecting devices 23 are simplified, so the structure of the micromachined gyroscope is simplified, and a mounting space of the micromachined gyroscope is saved.

The present disclosure further provides an electronic product. The electronic product comprises a main body and the micromachined gyroscope according to any one of the embodiments of the present disclosure mentioned above. The micromachined gyroscope is installed in the main body and is configured for calculating the angular velocity of the electronic product, so as to facilitate the control of the electronic product. Since the micromachined gyroscope has the above-mentioned technical effects, the electronic product including the micromachined gyroscope should also have corresponding technical effects, which are not repeated herein.

The above are only optional embodiments of the present disclosure, it should be pointed out that for those of ordinary skill in the art, improvements can be made without departing from the inventive concept of the present disclosure, which should all fall within the protection scope of the present disclosure.

What is claimed is:

1. A micromachined gyroscope, comprising:
a driving component;
a detecting component;
two first connecting components; and
two second connecting components;
wherein the driving component comprises two first driving pieces, two second driving pieces, and driving devices; the driving devices drive the two first driving pieces and the two second driving pieces to move, so when the two first driving pieces move along a first direction, the two second driving pieces move along a second direction perpendicular to the first direction; and the two first driving pieces are arranged relative to each other along the first direction; the two second driving pieces are arranged relative to each other along the second direction;

wherein the detecting component comprises two first detecting pieces arranged along a third direction, two second detecting pieces arranged along a fourth direction, and detecting devices for detecting movement distances of the first detecting pieces and/or movement distances of the second detecting pieces along a fifth direction;

wherein the two first connecting components are arranged along the fourth direction; each of the first connecting components is connected with an adjacent first driving piece, an adjacent second driving piece, and an adjacent first detecting piece; each of the first connecting components rotates around a center of each of the first connecting components, so the second detecting pieces reciprocate along the third direction;

wherein the two second connecting components are arranged along the third direction; each of the second connecting components is connected with an adjacent first driving piece, an adjacent second driving piece, and an adjacent second detecting piece; each of the second connecting components rotates around a center of each of the second connecting components, so the first detecting pieces reciprocate along the fourth direction;

wherein a predetermined angle is defined between the first direction and the third direction; the fifth direction is perpendicular to the first direction and the third direction.

2. The micromachined gyroscope according to claim 1, wherein the driving devices control the two first driving pieces to move in opposite directions along the first direction;

wherein the driving devices control the two second driving pieces to move in opposite directions along the second direction;

wherein when the two first driving pieces move close to each other, the two second driving pieces move away from each other;

wherein when the two first driving pieces move away from each other, the two second driving pieces move close to each other.

3. The micromachined gyroscope according to claim 2, wherein the first driving pieces and the second driving pieces comprises mounting holes; each of the driving devices is arranged in a corresponding mounting hole;

wherein along the fifth direction, the detecting devices are arranged above the first detecting pieces; there is a gap between each of the detecting devices and a corresponding first detecting piece; and/or along the fifth direction, the detecting devices are arranged above the second detecting pieces;

there is a gap between each of the detecting devices and a corresponding second detecting piece.

4. The micromachined gyroscope according to claim 1, wherein the first connecting components and the second connecting components comprises rotating pieces, connecting beams and first flexible beams; the micromachined gyroscope further comprises first fixing pieces;

wherein the two first driving pieces are symmetrically arranged along the rotating pieces; the two second driving pieces are symmetrically arranged along the rotating pieces; each of the first driving pieces is connected with a corresponding rotating piece through a corresponding connecting beam and each of the second driving pieces is connected with a corresponding rotating piece through a corresponding connecting beam, so the rotating pieces are driven to rotate with respect to the first fixing pieces;

wherein each of the first detecting pieces and/or each of the second detecting pieces is connected with the corresponding rotating piece through a corresponding first flexible beam.

5. The micromachined gyroscope according to claim 4, wherein the first connecting components and the second connecting components comprise second flexible beams; a first end of each of the second flexible beams is connected with a corresponding rotating piece; a second end of each of the second flexible beams is connected with a corresponding first fixing piece.

6. The micromachined gyroscope according to claim 5, wherein the micromachined gyroscope further comprises second fixing pieces and guide beams; a first end of each of the guide beams is connected with a corresponding second fixing piece; a second end of each of the guide beams is connected with a corresponding first driving piece or a corresponding second driving piece;

wherein a plurality of the second fixing pieces are arranged at intervals along a circumferential direction of each of the first driving pieces and/or each of the second driving pieces to limit movements of the first driving pieces and/or the second driving pieces.

7. The micromachined gyroscope according to claim 6, wherein the micromachined gyroscope further comprises third fixing pieces and third flexible beams; a first end of each of the third flexible beams is connected with a corresponding third fixing piece and a second end of each of the third flexible beams is connected with a corresponding first detecting piece or a corresponding second detecting piece to limit movements of the first detecting pieces or the second detecting pieces.

8. The micromachined gyroscope according to claim 7, wherein the micromachined gyroscope further comprise a central connecting piece and fourth flexible beams;

wherein two ends of the central connecting piece are respectively connected with the two first detecting pieces through corresponding fourth flexible beams along the third direction;

wherein another two ends of the central connecting piece are respectively connected with the two second detecting pieces through corresponding fourth flexible beams.

9. The micromachined gyroscope according to claim 3, wherein a driving capacitor is formed between each of the driving devices and the corresponding first driving piece and/or the corresponding second driving piece;

wherein a detecting capacitance is formed between each of the detecting devices and the corresponding first detecting piece and/or the corresponding second detecting piece.

10. An electronic product, comprising:
a main body; and
the micromachined gyroscope according to claim 1;
wherein the micromachined gyroscope is installed in the main body.

\* \* \* \* \*